May 29, 1923.                     1,456,839
C. T. WESTLAKE
ARTICULATED CAR
Filed Jan. 5, 1923
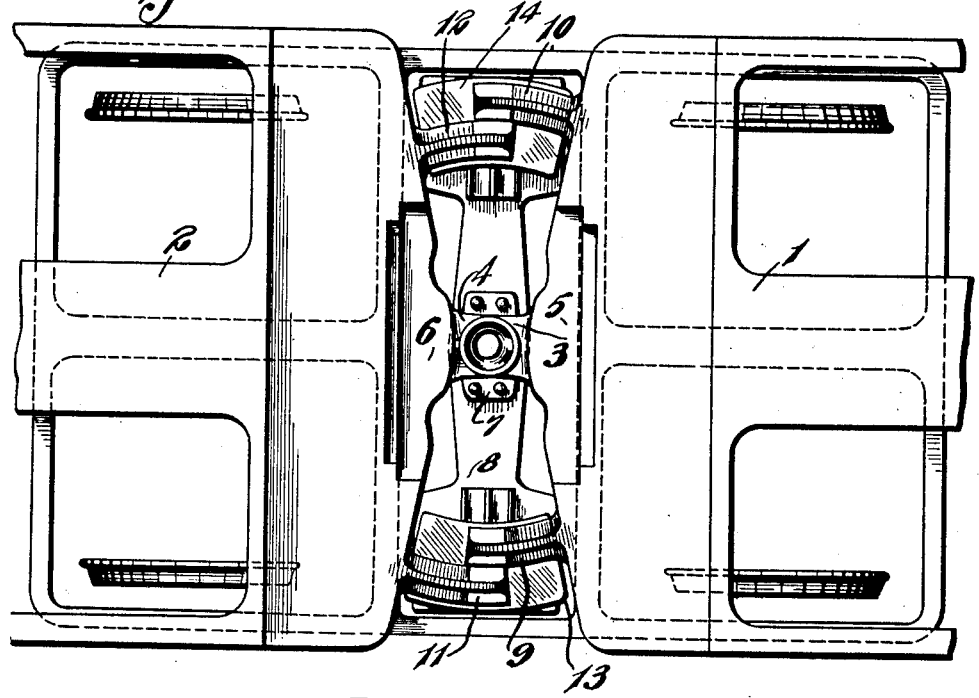
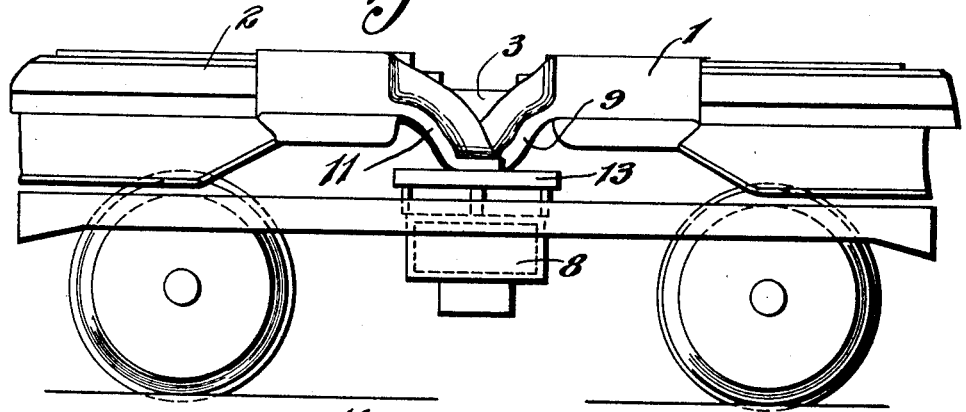
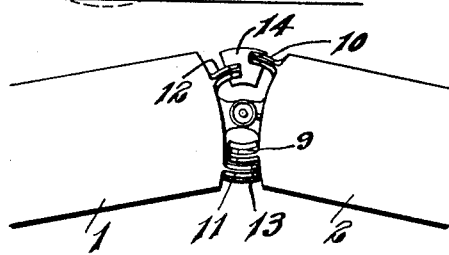
Inventor:
CHARLES T. WESTLAKE Patented May 29, 1923.

1,456,839

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

ARTICULATED CAR.

Application filed January 5, 1923. Serial No. 610,873.

*To all whom it may concern:*

Be it known that I, CHARLES T. WESTLAKE, a citizen of the United States, residing at St. Louis, Missouri, have invented a certain new and useful Improvement in Articulated Cars, of which the following is a full, clear, and exact description, such as will enable others skilled in the art to which it appertains to make and use the same, reference being had to the accompanying drawings, forming part of this application.

My invention relates to railroad rolling stock and consists in an improvement in truck and body side bearing construction especially adapted for use in articulated cars similar to those shown in copending Pflager applications Serial Numbers 609,522, and 609,523, both filed Dec. 28, 1922.

In previous assembly of articulated cars with a common truck, it has been necessary to allow sufficient clearance between the adjacent ends of the side bearings on the opposing ends of the cars to permit the side bearings to move toward each other when on the inner side of a curve and to make the side bearings on the trucks sufficiently long to permit the side bearings of the car body to move away from each other when on the outer side of the curve. Assuming each body side bearing to be six inches long and to have five inches motion each way, it is obvious that each body side bearing would require a truck side bearing sixteen inches long. With the two adjacent body side bearings aligned longitudinally of the truck, the truck's side bearing must be thirty-two inches long to accommodate the extreme movements of the body side bearings. Such a dimension is impractical, one reason being that with the car bodies rolling in opposite directions on a curve, the outer body side bearing contacting with the truck side bearing will bear downwardly on the latter at a point outside of the base line of the supporting truck bolster and tend to tip the latter. To overcome this objection it has been customary to provide the truck with two bolsters so as to allow ample space for the body side bearings to operate in without traveling beyond the base line of the supporting truck bolster.

The object of my invention is to eliminate this unwieldy and objectionable arrangement of the body and truck side bearings and I accomplish this object by the construction shown in the accompanying drawings, in which—

Figure 1 is a top view of the adjacent ends of the two articulated car bodies and partially indicating the truck upon which the articulated bodies are mounted.

Figure 2 is a side elevation of the structure shown in Figure 1.

Figure 3 is a view indicating the position of the elements on a curve.

The two car bodies 1 and 2 have interengaging center plate forming projections 3 and 4, respectively, formed upon the body end sills 5 and 6, respectively and extending downwardly and outwardly therefrom on the longitudinal center lines of the cars. These center plates are supported by a truck center plate 7 mounted upon the truck bolster 8.

Spaced transversely of the end sill of each car are body side bearings 9, 10, 11 and 12. These also are preferably formed integrally with the end sills and extend downwardly and outwardly therefrom over the transverse center line of the truck and rest upon suitable truck side bearings 13 and 14 mounted upon the truck bolster 8.

It will be noted that the body side bearings on each car are spaced at different distances from the longitudinal center line of the car. In the construction shown, the lefthand bearings 9 and 12 are nearer to the center plate than are the righthand bearings 10 and 11. The difference in the distances from the center of the car to the lefthand bearing and to the righthand bearing amounts to the width of one of the side bearings, thereby permitting the opposing bearings on the two car bodies to move past each other without interference.

The distance between center lines of side bearings on each car is the same and obviously the ends of the cars opposite to those shown when similarly constructed permit either end of the car to form the pivoted end of an articulated car and will cooperate with either end of a similarly constructed car.

With this construction, the total length of the truck side bearing may be reduced one-half. The body side bearings at either extreme of their movement longitudinally of the truck are retained within the base of the truck bolster and there is no tendency to tilt the latter longitudinally of the truck.

While I have shown the body, center and side bearings as formed integrally with the end sill and such is my preferred construction, it will be understood that the invention may well be embodied in a structure in which the bearings are made individually and assembled with the end sill, and other modifications in the details of construction and arrangement of the bearings may be made without departing from the spirit of my invention as expressed in the accompanying claims.

I claim:

1. In a railway car, side bearings at opposite sides of one end of the car, the truck engaging portion of one of said bearings being located at a greater distance from the longitudinal center line of the car than the corresponding portion of the other of said bearings.

2. In a railway car, side bearings at opposite sides of one end of the car, and curved horizontally and concentrically, said bearings being located at different distances from the longitudinal center line of the car.

3. In a railway car, side bearings at opposite sides of each end of the car, the bearings at the right-hand sides of the car ends being located at equal distances from the longitudinal center line of the car but at different distances from the longitudinal center line of the car than the bearings at the left-hand sides of the car ends.

4. In combination, two railway car bodies pivotally united at the centers of their adjacent ends, and respective side bearings on said bodies remote from said centers, the adjacent side bearings on the two bodies being adapted to overlap each other transversely of the car.

5. In a railway car, an end sill, a centrally located downwardly and outwardly extending projection on said sill forming a body center plate, downwardly and outwardly extending projections on said sills spaced from said central projection and forming body side bearings, said side projections being curved about said central projection as a center and located at different distances from said central projection whereby said side bearings will align transversely of the car center line with correspondingly shaped and located projections on the opposing end of an adjacent car.

6. In combination, two railway car bodies pivotally united at the centers of their adjacent ends, respective side bearings on said bodies remote from said centers, the adjacent side bearings on the two bodies being adapted to overlap each other transversely of the car, and a truck provided with side bearings extending transversely of the car so as to engage all of said body side bearings simultaneously.

7. In combination, two railway car bodies pivotally united at the centers of their adjacent ends, respective side bearings on said bodies remote from said centers, the adjacent side bearings on the two bodies being adapted to overlap each other transversely of the car, a truck having a single bolster, and side bearings on said bolster each adapted to engage two adjacent body side bearings simultaneously.

8. In combination, a car truck, articulated car bodies having a common center bearing on said truck, and individual side bearings on said bodies remote from said centers each normally positioned over the transverse center line of said truck.

9. In combination, a car truck having a truck bolster, side bearings on said bolster, articulated car bodies mounted on said truck, side bearings on said car bodies remote from the longitudinal center lines of the cars and so constructed and arranged that they are always supported by said truck side bearing within the base of said truck bolster.

10. In a railway car, a one-piece cast end sill including a centrally located downwardly and outwardly extended projection forming a body center plate and downwardly and outwardly extending projections spaced from said central projection and forming side bearings, said side projections being spaced at different distances from said central projection.

11. In a railway car, side bearings at opposite sides of one end of the car and at different distances from the longitudinal center line of the car, the difference in said distances being as great as the width of one side bearing across the car end.

12. In a railway car, side bearings at opposite sides of one end of the car, the distance from the center line of the car to the center line of one bearing being greater than the distance from the center line of the car to the center line of the other bearing.

In testimony whereof I hereunto affix my signature this 28th day of Dec., 1922.

CHARLES T. WESTLAKE.